United States Patent
Zeng et al.

(10) Patent No.: US 10,970,469 B2
(45) Date of Patent: Apr. 6, 2021

(54) SYSTEM AND METHOD FOR USING A SCRIPTING LANGUAGE TO DYNAMICALLY STYLE A CASCADING STYLE SHEET

(71) Applicant: Citrix Systems, Inc., Burlington, MA (US)

(72) Inventors: Zhen Zeng, Nanjing (CN); Cheng Xie, Nanjing (CN)

(73) Assignee: Citrix Systems, Inc., Burlington, MA (US)

( * ) Notice: Subject to any disclaimer, the term of this patent is extended or adjusted under 35 U.S.C. 154(b) by 0 days.

(21) Appl. No.: 16/544,271

(22) Filed: Aug. 19, 2019

(65) Prior Publication Data

US 2021/0019367 A1 Jan. 21, 2021

(51) Int. Cl.
G06F 40/14 (2020.01)
G06F 8/30 (2018.01)
G06F 16/958 (2019.01)
G06F 40/166 (2020.01)

(52) U.S. Cl.
CPC ............ *G06F 40/14* (2020.01); *G06F 8/315* (2013.01); *G06F 16/986* (2019.01); *G06F 40/166* (2020.01)

(58) Field of Classification Search
CPC ...... G06F 40/14; G06F 16/986; G06F 40/166; G06F 8/315
USPC .................................................. 715/235
See application file for complete search history.

(56) References Cited

U.S. PATENT DOCUMENTS

| | | | |
|---|---|---|---|
| 8,191,038 B1 * | 5/2012 | Samuel | G06F 8/41 717/106 |
| 9,542,379 B1 * | 1/2017 | Joshi | G06F 40/103 |
| 2004/0148307 A1 * | 7/2004 | Rempell | G06F 40/166 |
| 2008/0141116 A1 * | 6/2008 | Mohan | G06F 16/958 715/236 |
| 2016/0255496 A1 * | 9/2016 | Andersson | G06F 40/154 715/745 |

OTHER PUBLICATIONS

"Jquery Css." How to Have Jquery Variable in .Css()?, www.xspdf.com/resolution/55442855.html. (Year: 2020).*

* cited by examiner

*Primary Examiner* — Stephen S Hong
*Assistant Examiner* — Broderick C Anderson
(74) *Attorney, Agent, or Firm* — Michael T. Abramson; Holland & Knight LLP (57) ABSTRACT

Described embodiments provide a method, computer program product, and computer system for generating, by a computing device, a data file including at least one property from a first cascading style sheet (CSS) file, the at least one property defining a scripting language object. A scripting language file may be generated, the scripting language file may include a scripting language variable for the scripting language object. A second CSS file may be generated by replacing the at least one property from the data file with the scripting language variable of the scripting language file. An element of a webpage referenced by the scripting language object may be rendered based upon, at least in part, the scripting language variable of the second CSS file.

20 Claims, 5 Drawing Sheets

SYSTEM AND METHOD FOR USING A SCRIPTING LANGUAGE TO DYNAMICALLY STYLE A CASCADING STYLE SHEET

RELATED APPLICATION

This application claims priority to PCT Application No. PCT/CN2019/096245, filed on 16 Jul. 2019, the entire contents of which are incorporated herein by reference.

BACKGROUND

Generally, the value of Cascading Style Sheet (CSS) properties are usually static, which may be defined in CSS files. Typically, if a user wants to change a specific element style, a new style is added for that element to override the previous styles, or alternatively, the reference of that element may be obtained and the specific style may be set with the desired specific value. Each of these methods generally require Document Object Model (DOM) as the communication bridge.

BRIEF SUMMARY OF DISCLOSURE

In one example implementation, a method, performed by one or more computing devices, may include but is not limited to generating, by a computing device, a data file including at least one property from a first cascading style sheet (CSS) file, the at least one property defining a scripting language object. A scripting language file may be generated, the scripting language file may include a scripting language variable for the scripting language object. A second CSS file may be generated by replacing the at least one property from the data file with the scripting language variable of the scripting language file. An element of a webpage referenced by the scripting language object may be rendered based upon, at least in part, the scripting language variable of the second CSS file.

One or more of the following example features may be included. The data file may include information of the at least one property extracted from the first CSS file. The data file may include information of the scripting language variable in the second CSS file. It may be determined that a value of the scripting language object has changed in the scripting language file by checking a flag for the scripting language object. A style of the element may be updated based upon, at least in part, determining that the value of the scripting language object has changed in the scripting language file. The style may be updated through inline style. Determining that the value of the scripting language object has changed in the scripting language file may include determining that the flag is set for the scripting language object.

In another example implementation, a computing system may include one or more processors and one or more memories configured to perform operations that may include but are not limited to generating, by a computing device, a data file including at least one property from a first cascading style sheet (CSS) file, the at least one property defining a scripting language object. A scripting language file may be generated, the scripting language file may include a scripting language variable for the scripting language object. A second CSS file may be generated by replacing the at least one property from the data file with the scripting language variable of the scripting language file. An element of a webpage referenced by the scripting language object may be rendered based upon, at least in part, the scripting language variable of the second CSS file.

One or more of the following example features may be included. The data file may include information of the at least one property extracted from the first CSS file. The data file may include information of the scripting language variable in the second CSS file. It may be determined that a value of the scripting language object has changed in the scripting language file by checking a flag for the scripting language object. A style of the element may be updated based upon, at least in part, determining that the value of the scripting language object has changed in the scripting language file. The style may be updated through inline style. Determining that the value of the scripting language object has changed in the scripting language file may include determining that the flag is set for the scripting language object.

In another example implementation, a computer program product may reside on a computer readable storage medium having a plurality of instructions stored thereon which, when executed by one or more processors, may cause the one or more processors to perform operations that may include but are not limited to generating, by a computing device, a data file including at least one property from a first cascading style sheet (CSS) file, the at least one property defining a scripting language object. A scripting language file may be generated, the scripting language file may include a scripting language variable for the scripting language object. A second CSS file may be generated by replacing the at least one property from the data file with the scripting language variable of the scripting language file. An element of a webpage referenced by the scripting language object may be rendered based upon, at least in part, the scripting language variable of the second CSS file.

One or more of the following example features may be included. The data file may include information of the at least one property extracted from the first CSS file. The data file may include information of the scripting language variable in the second CSS file. It may be determined that a value of the scripting language object has changed in the scripting language file by checking a flag for the scripting language object. A style of the element may be updated based upon, at least in part, determining that the value of the scripting language object has changed in the scripting language file. The style may be updated through inline style. Determining that the value of the scripting language object has changed in the scripting language file may include determining that the flag is set for the scripting language object.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings may indicate like elements.

DETAILED DESCRIPTION

Cascading Style Sheet (CSS) files may be used to format the contents of a webpage. It may contain customized, global properties for how to display HTML elements. CSS files may use values to define such things as the size, color, font, line spacing, indentation, borders, and location of HTML elements. As noted above, methods for changing a specific element style generally require Document Object Model (DOM) as the communication bridge, which can be a slow process since the time-cost of DOM manipulation is higher and each of the updates need to be tracked by the developer, which is inconvenient. The ability to dynamically set the value of CSS properties may alleviate both issues. While the value of CSS properties may be set dynamically with expression( ) or calc( ), both these methods simply calculate the value with an expression once at the initialization time, which may actually be considered as pseudo dynamic, and therefore any changes after initialization time would still need to be updated and tracked with DOM. As a result of the extra DOM manipulation and communication between DOM and the scripting language requirements, the system is slower and the user experience is diminished.

As will be discussed below, to address this problem and create a true ability to dynamically set the value of CSS properties, the present disclosure may introduce a data binding mechanism where variables in a scripting language (e.g., JavaScript) may be used directly in CSS, rather than the other way around as is the current method. By introducing dynamic styles in CSS with the scripting language using the disclosed data binding mechanism (e.g., a defined variable in the scripting language that may be directly used in CSS as the value of the property), the CSS styles may be truly dynamically controlled (even after initialization time) by the scripting language variables, which can avoid the above-noted time-cost of DOM manipulation in order to improve performance. Additionally, a flag (e.g., dirty flag) checking and change detection mechanism may be used to reflect the styles of the elements after the value of the CSS properties has been modified by the scripting language, which may also improve performance and user experience by eliminating redundant and extra DOM manipulations.

Figure 1:
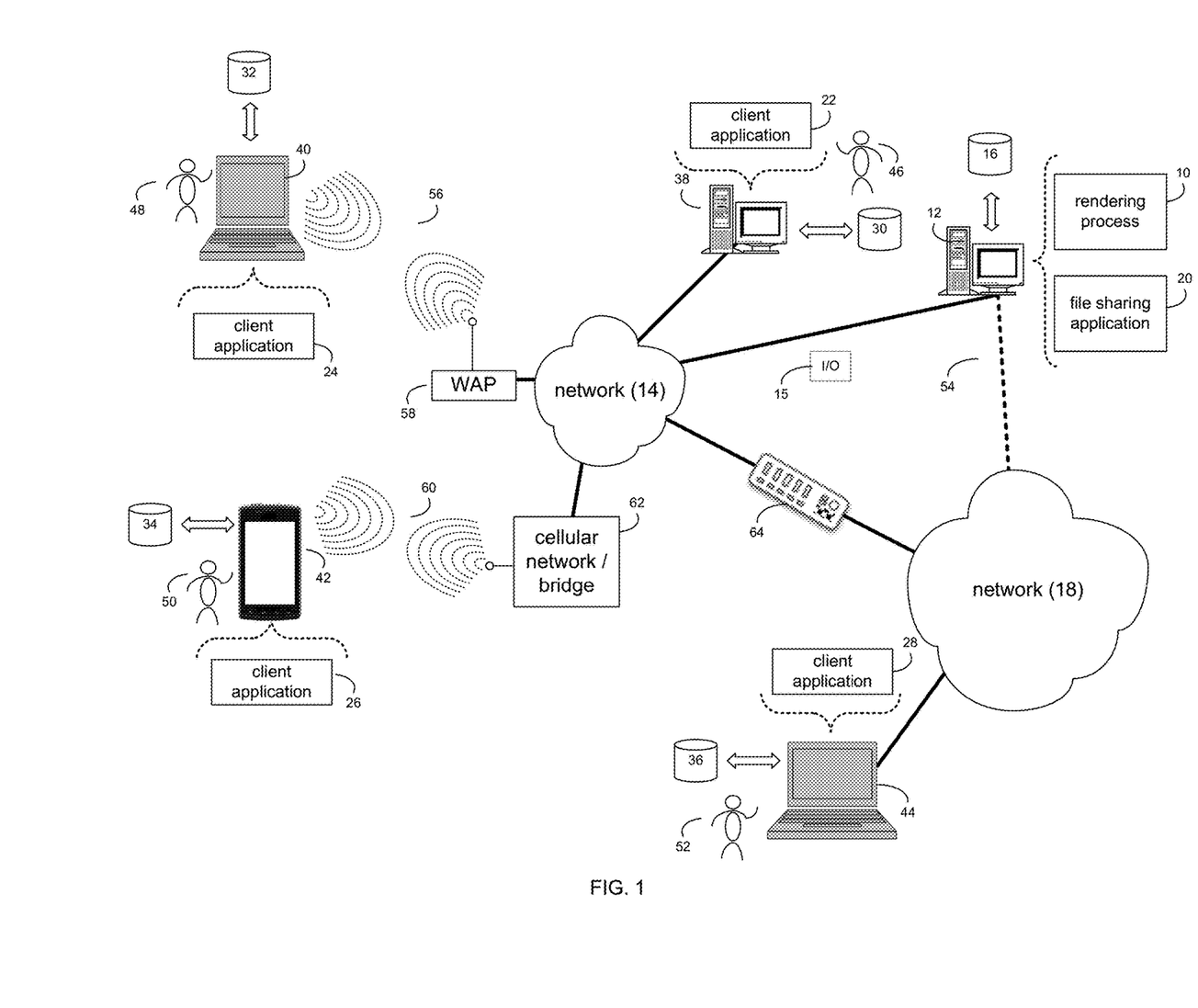
FIG. 1 is an example diagrammatic view of a rendering process coupled to an example network environment according to one or more example implementations of the disclosure.

Referring now to the example implementation of FIG. 1, there is shown rendering process 10 that may reside on and may be executed by a computer (e.g., one or more remote machines also referred to as computer 12), which may be connected to a network (e.g., network 14) (e.g., the internet or a local area network). In some implementations, the instruction sets and subroutines of rendering process 10, which may be stored on storage device, such as storage device 16, coupled to computer 12, may be executed by one or more processors and one or more memory architectures included within computer 12. In some implementations, rendering process 10 may be a component of a data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. Computer 12 (e.g., via rendering process 10) may execute, operate or otherwise provide an application that may be any one of the following: software; a program; executable instructions; a virtual machine; a hypervisor; a web browser; a web-based client; a client-server application; a thin-client computing client; an ActiveX control; a Java® applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. In some implementations, rendering process 10 and/or file sharing application 20 may be accessed via one or more of client applications 22, 24, 26, 28 to facilitate the transfer of data and/or information among computer 12 and client electronic devices 38, 40, 42, and 44 via network 14 and/or network 18. Client electronic devices 38, 40, 42, 44 (and/or computer 12) may include, but are not limited to, a personal computer (e.g., client electronic device 38), a mobile computing device such as a laptop computer (e.g., client electronic device 40), a smart/data-enabled, cellular phone (e.g., client electronic device 42), a notebook computer (e.g., client electronic device 44), and a tablet, a television, a smart speaker, an Internet of Things (IoT) device, a media (e.g., audio/video, photo, etc.) capturing and/or output device, an audio input and/or recording device (e.g., a microphone), a storage system (e.g., a Network Attached Storage (NAS) system, a Storage Area Network (SAN)), a server computer (e.g., a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality), a series of server computers, a server farm/datacenter, a mainframe computer, a computing cloud, or any other network enabled device. In some implementations, each of the aforementioned may be generally described as a computing device, and may also be referred to as a local machine, a client, a client node, a client computer, a client device, a client electronic device, a computing device, a computer, an endpoint, or an endpoint node, herein referred to as either a client electronic device or a computer. In some implementations, the client electronic devices may have the capacity to function as both a client node seeking access to resources provided by computer 12, and as computer 12 providing access to hosted resources for other client electronic devices.

In certain implementations, the client electronic devices and/or computer 12 may be a physical or virtual device. In many implementations, the client electronic devices and/or computer 12 may be any device capable of performing operations, such as a dedicated processor, a portion of a processor, a virtual processor, a portion of a virtual processor, portion of a virtual device, or a virtual device. In some implementations, a processor may be a physical processor or a virtual processor. The client electronic devices and/or computer 12 may be a virtual machine that may provide to a user of the client electronic device access to a computing environment. The virtual machine may be managed by, for example, a hypervisor, a virtual machine manager (VMM), or any other hardware virtualization technique. In some implementations, a virtual processor may correspond to one or more parts of one or more physical processors. In some implementations, the instructions/logic may be distributed and executed across one or more processors, virtual or physical, to execute the instructions/logic. The client electronic devices and/or computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, the client electronic devices and/or computer 12 may include storage devices (e.g., storage device 16, 30, 32, 34, 36) such as: an electrical connection having one or more wires; a portable computer diskette; a hard disk drive; all forms of flash memory storage devices including an erasable programmable read-only memory (EPROM); a tape drive; an optical drive/fiber; a Redundant Array of Independent Disks (RAID) array (or other array); a random access memory (RAM); a read-only memory (ROM); a portable compact disc read-only memory (CD-ROM); a digital versatile disk (DVD); a static random access memory (SRAM); a memory stick; a floppy disk; a mechanically encoded device; a media such as those supporting the internet or an intranet; a magnetic storage device; or combination thereof. In some implementations, the client electronic devices and/or computer 12 may include a data store, such as a database (e.g., relational database, object-oriented database, triplestore database, etc.) and may be located within any suitable memory location (e.g., storage device 16 coupled to computer 12). In some implementations, the storage devices may be communicatively coupled to the client electronic devices and/or computer 12 to store data, metadata, or other information to facilities operation of the present disclosure.

In some implementations, the client electronic devices and/or computer 12 may be communicatively coupled to the data store so that data, metadata, information, etc. described throughout the present disclosure may be stored and accessed. In some implementations, the client electronic devices and/or computer 12 may utilize any known database management system in order to provide multi-user access to one or more databases, such as the above noted relational database. In some implementations, the data store may also be a custom database, such as, for example, a flat file database or an XML database. In some implementations, any other form(s) of a data storage structure and/or organization may also be used.

In some implementations, computer 12 may execute a file sharing application (e.g., file sharing application 20), examples of which may include, but are not limited to, e.g., a web page creation and publishing application, a web conferencing application, a video conferencing application, a voice-over-IP application, a video-over-IP application, an Instant Messaging (IM)/"chat" application, a short messaging service (SMS)/multimedia messaging service (MMS) application, a remote presentation services program or other program that uses a thin-client or a remote-display protocol to capture display output generated by an application executing on computer 12 and transmit the application display output to the client electronic device, or other application that allows for file sharing. An example of file sharing application 20 may include, but is not limited to, e.g., ShareFile® by Citrix Systems, Inc. of Ft. Lauderdale, Fla.

In some implementations, rendering process 10 may be a standalone application, or may be an applet/application/script/extension that may interact with and/or be executed within file sharing application 20, a component of file sharing application 20, and/or one or more of client applications 22, 24, 26, 28. In some implementations, file sharing application 20 may be a standalone application, or may be an applet/application/script/extension that may interact with and/or be executed within rendering process 10, a component of rendering process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of rendering process 10 and/or file sharing application 20. Examples of client applications 22, 24, 26, 28 may include, but are not limited to, e.g., a web page creation and publishing application, a web conferencing application, a video conferencing application, a voice-over-IP application, a video-over-IP application, an Instant Messaging (IM)/"chat" application, a short messaging service (SMS)/multimedia messaging service (MMS) application, or other application that allows for file sharing, a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of client applications 22, 24, 26, 28 may be configured to effectuate some or all of the functionality of rendering process 10 (and vice versa). Accordingly, in some implementations, rendering process 10 may be a purely server-side application, a purely client-side application, or a hybrid server-side/client-side application that is cooperatively executed by one or more of client applications 22, 24, 26, 28 and/or rendering process 10.

In some implementations, one or more of client applications 22, 24, 26, 28 may be configured to effectuate some or all of the functionality of file sharing application 20 (and vice versa). Accordingly, in some implementations, file sharing application 20 may be a purely server-side application, a purely client-side application, or a hybrid server-side/client-side application that is cooperatively executed by one or more of client applications 22, 24, 26, 28 and/or file sharing application 20. As one or more of client applications 22, 24, 26, 28, rendering process 10, and file sharing application 20, taken singly or in any combination, may effectuate some or all of the same functionality, any description of effectuating such functionality via one or more of client applications 22, 24, 26, 28, rendering process 10, file sharing application 20, or combination thereof, and any described interaction(s) between one or more of client applications 22, 24, 26, 28, rendering process 10, file sharing application 20, or combination thereof to effectuate such functionality, should be taken as an example only and not to limit the scope of the disclosure.

In some implementations, one or more of users 46, 48, 50, 52 may access computer 12 and rendering process 10 (e.g., using one or more of client electronic devices 38, 40, 42, 44) directly through network 14 or through secondary network 18, and rendering process 10 may include one or more user interfaces, such as browsers and textual or graphical user interfaces, through which users 46, 48, 50, 52 may access rendering process 10. Further, computer 12 may be connected to network 14 through secondary network 18, as illustrated with phantom link line 54. In some implementations, the client electronic devices may communicate with computer 12 (and vice versa) via intermediary appliance (e.g., appliance 64), which in some implementations may include rendering process 10. Appliance 64 may be positioned between networks 14 and 18, and may also be referred to as a network interface or gateway. In some implementations, appliance 64 may operate as an application delivery controller (ADC) to provide users with access to business applications and other data deployed in a datacenter, a cloud environment, or delivered as Software as a Service (SaaS) across a range of computing devices, and/or provide other functionality such as load balancing, etc. In some implementations, multiple appliances may be used, and appliance(s) 64 may be deployed as part of network 14 and/or 18.

In some implementations, the client electronic devices and/or computer 12 may be directly or indirectly coupled to networks 14 and/or 18 via a network connection (e.g., a wireless or a hardwired network connection). Further, in some examples, a wireless communication connection may include a wireless access point (e.g., WAP 58). The wireless access point may be, for example, an IEEE 802.11a, 802.11b, 802.11g, 802.11n, 802.11ac, Wi-Fi®, RFID, and/or Bluetooth™ (e.g., 802.15) (including Bluetooth™ Low Energy) device that is capable of establishing wireless communication channel (e.g., communications channel 56 between client electronic device 40 and WAP 58). In some examples, the client electronic devices (e.g., client electronic device 42) and/or computer 12 may be wirelessly coupled to a network via wireless communication channel (e.g., channel 60) using cellular network/bridge (e.g., bridge 62).

In some implementations, networks 14 and/or 18 may include and/or be connected to one or more secondary networks, examples of which may include but are not limited to: a local area network (LAN); a personal area network (PAN); a metropolitan area network (MAN); a wide area network (WAN) or other telecommunications network facility, a primary public network; a primary private network; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of wireless local-area network (WLAN) interconnection (e.g., Near Field Communication (NFC)) may also be used.

In some implementations, various I/O requests (e.g., I/O request 15) may be sent from, e.g., client applications 22, 24, 26, 28 to, e.g., computer 12 (and vice versa) using network 14 and/or 18. Examples of I/O request 15 may include but are not limited to, data write requests (e.g., a request that content be written to computer 12) and data read requests (e.g., a request that content be read from computer 12).

Figure 2:
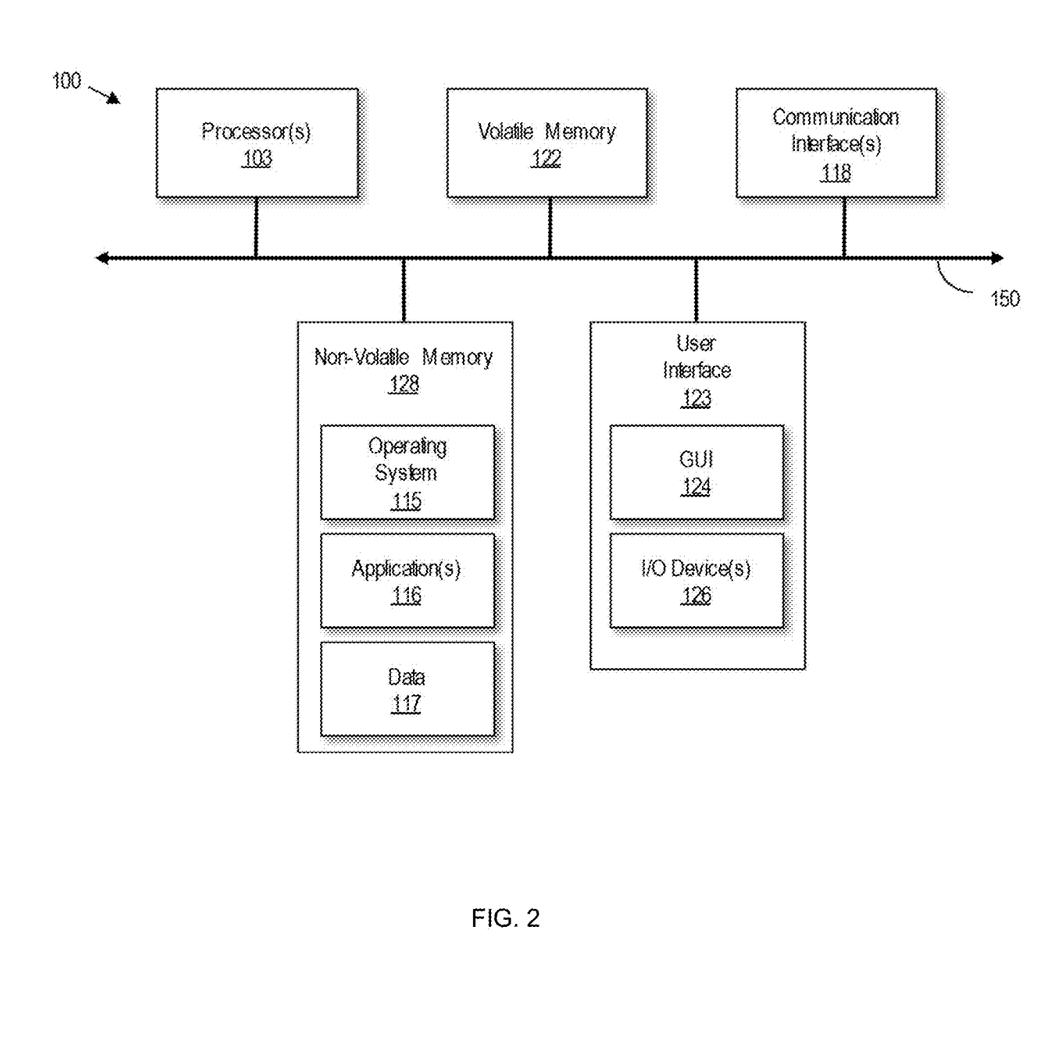
FIG. 2 is an example diagrammatic view of a computing device of FIG. 1 according to one or more example implementations of the disclosure.

Referring also to the example implementation of FIG. 2, there is shown a block diagram of computing device 100 that may be useful for practicing an implementation of the client electronic devices, appliance 64 and/or computer 12. Computing device 100 may include one or more processors 103, volatile memory 122 (e.g., random access memory (RAM)), non-volatile memory 128, user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

UI 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 may store operating system 115, one or more applications 116, and data 117 such that, for example, computer instructions of operating system 115 and/or applications 116 are executed by processor(s) 103 out of volatile memory 122. In some implementations, volatile memory 122 may include one or more types of RAM and/or a cache memory that may offer a faster response time than a main memory. Data may be entered using an input device of GUI 124 or received from I/O device(s) 126. Various elements of computer 100 may communicate via communications bus 150.

Computing device 100 is shown merely as an example client electronic device or server, and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" may describe circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some implementations, the processor may be embodied in one or more application specific integrated circuits (ASICs), microprocessors, digital signal processors (DSPs), graphics processing units (GPUs), microcontrollers, field programmable gate arrays (FPGAs) or other hardware accelerators, micro-controller units (MCUs), programmable logic arrays (PLAs), multi-core processors, or general-purpose computers with associated memory.

Processor 103 may be analog, digital or mixed-signal. In some implementations, processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network (e.g., network 14 and/or 18 of FIG. 1) such as a Local Area Network (LAN), a Wide Area Network (WAN), a Body Area Network (BAN), a Personal Area Network (PAN), a Metropolitan Area Network (MAN), or the Internet through a variety of wired and/or wireless connections, including cellular connections.

In described implementations, computing device 100 may execute an application (e.g., the above-noted client application) on behalf of a user of a client electronic device. For example, computing device 100 may execute one or more virtual machines managed by a hypervisor. Each virtual machine may provide an execution session within which applications execute on behalf of a user or a client electronic device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
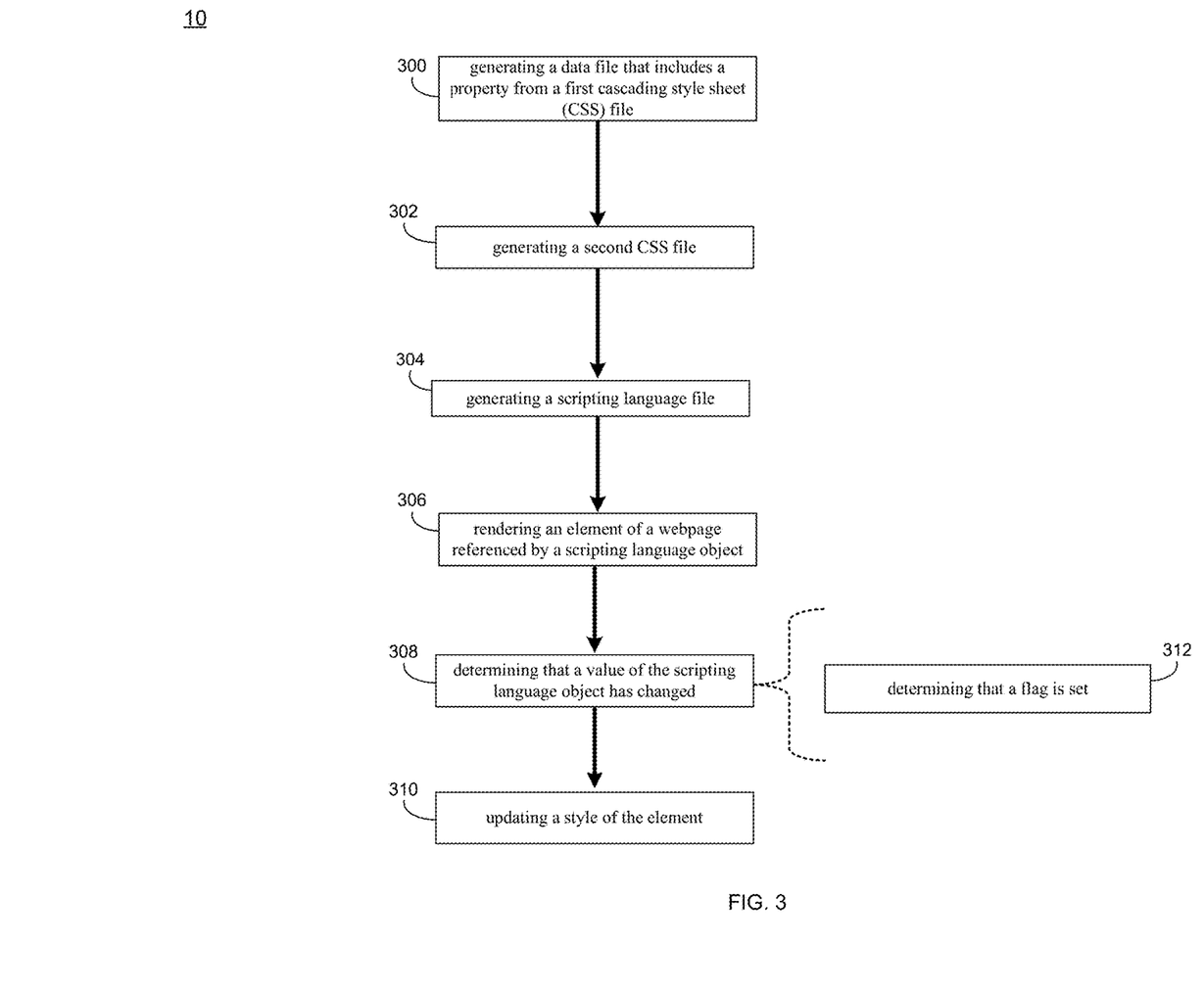
FIG. 3 is an example flowchart of a rendering process according to one or more example implementations of the disclosure.
Figure 4:
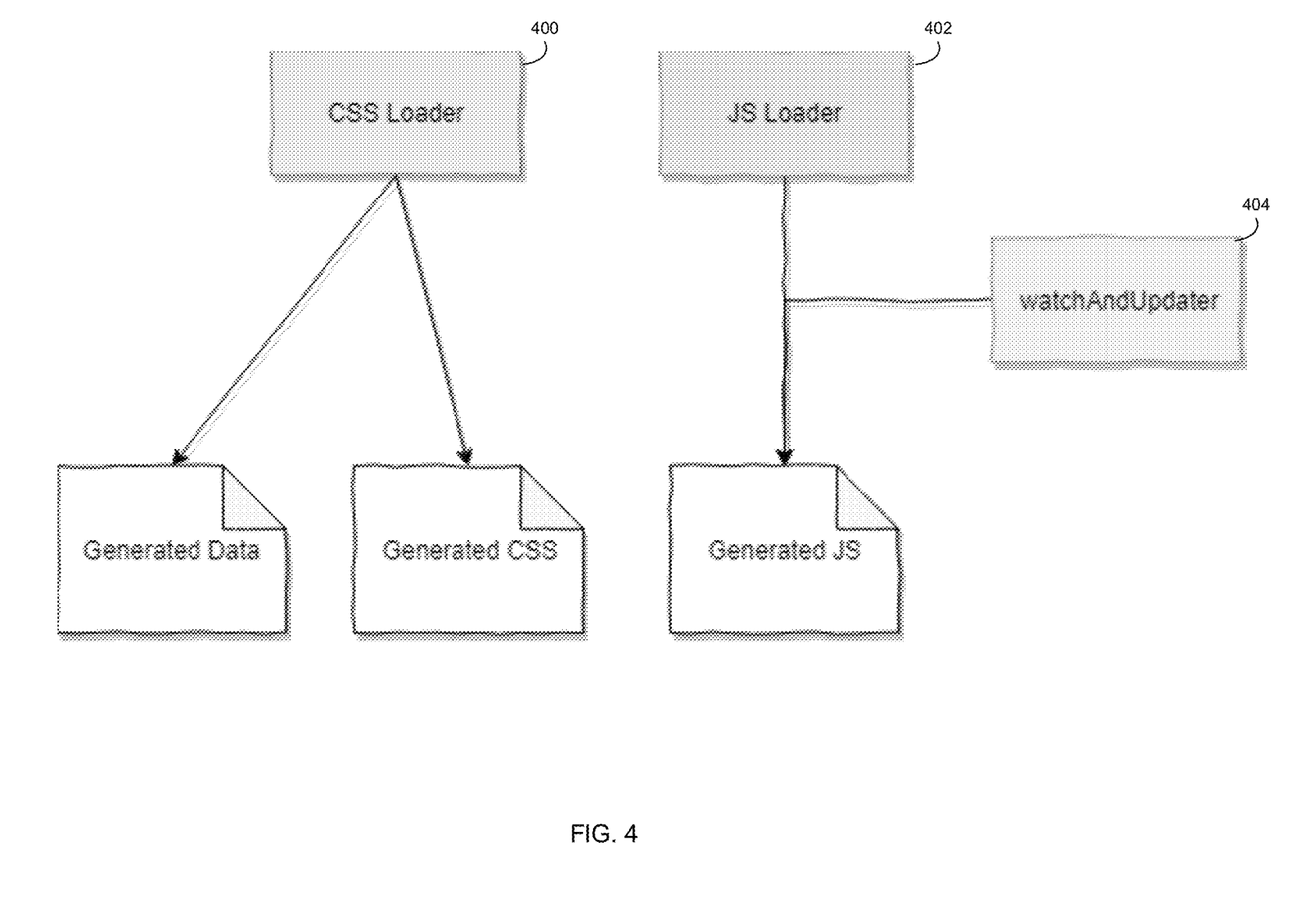
FIG. 4 is an example diagrammatic view of example components of a rendering process according to one or more example implementations of the disclosure.
Figure 5:
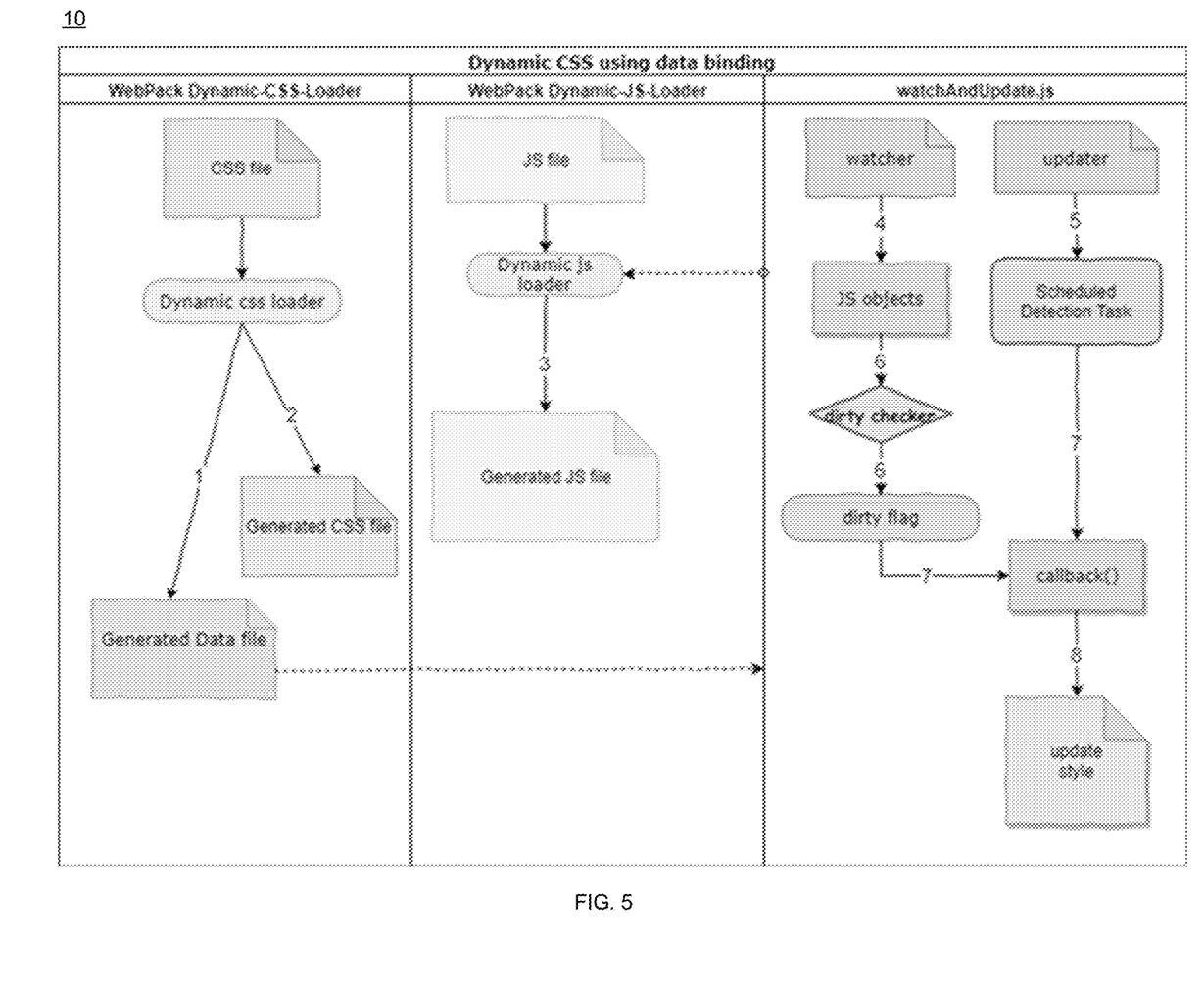
FIG. 5 is an example alternative view of a flowchart of a rendering process according to one or more example implementations of the disclosure.

As discussed above and referring also at least to the example implementations of FIGS. 3-5, at block 300, a computing device may (e.g., via rendering process 10), generate a data file including at least one property from a first cascading style sheet (CSS) file, the at least one property defining a scripting language object. At block 302, the computing device may (e.g., via rendering process 10) generate a second CSS file by replacing the at least one property from the data file with the scripting language variable of the scripting language object. At block 304, the computing device (e.g., via rendering process 10) may generate a scripting language file, the scripting language file may include a scripting language variable for the scripting language file. At block 306, the computing device may (e.g., via rendering process 10) render an element of a webpage referenced by the scripting language object based upon, at least in part, the scripting language variable of the second CSS file.

It will be appreciated that while the present disclosure is described as using JavaScript, any scripting language (e.g., PERL, Python, etc.) may be used without departing from the scope of the disclosure. As such, the use of JavaScript should be taken as example only and not to otherwise limit the scope of the disclosure.

To enable the ability to truly dynamically set the value of CSS properties, the present disclosure may introduce a data binding mechanism where variables in a scripting language (e.g., JavaScript) may be used directly in CSS, rather than the other way around as is the current method. By introducing dynamic styles in CSS with JavaScript using the disclosed data binding mechanism (e.g., a defined variable in JavaScript that may be directly used in CSS as the value of the property), the CSS styles may be dynamically controlled by JavaScript variables and without DOM manipulation.

For example, and referring at least to the example implementation of FIGS. 4 and 5, example and non-limiting components and component interactions of rendering process 10 that may be used to implement one or more features of the present disclosure are shown. In the example, the three components may include, e.g., a CSS Loader (e.g., CSS Loader 400), a JavaScript (JS) loader (e.g., JS Loader 402) and a change/update component (e.g., "WatchAndUpdate" 404).

In some implementations, at block 300, a computing device may (e.g., via rendering process 10), generate a data file including at least one property from a first cascading style sheet (CSS) file, the at least one property defining a scripting language object (e.g., a JavaScript object), and information of the at least one property may be extracted from the first CSS file. For instance, in the example, CSS Loader 400 may access CSS files with the information used to format the content of a webpage, transform the CSS files by replacing the properties using data binding with JavaScript variables, and extract the related information (e.g., property name, generated variable name, the binding JavaScript Object name, etc.) from the CSS files and provide it to a data file. In some implementations, since the CSS files will include JavaScript variables, which generally cannot be directly applied as the CSS properties of elements, rendering process 10 may scan the CSS files and extract the variables to a common file in order to build a bridge between CSS and JavaScript, enabling the variables in the CSS files to be correctly correlated to the JavaScript variables, and each change of the JavaScript variables may be correctly reflected in the elements. The extraction of related information from the CSS files may be a synchronous operation and may be considered complete after all CSS files have been downloaded and scanned.

In some implementations, at block 302, the computing device may (e.g., via rendering process 10) generate a second CSS file (e.g., a copy or modification of the first CSS file) by replacing the at least one property from the data file with a scripting language variable (e.g., JavaScript variable) of the JavaScript file. For example CSS Loader 400 may generate one or more new CSS files by transforming the properties from the data file (and extracted from first CSS file) with the generated CSS variables. The original CSS files, such as the first CSS file used to generate the second CSS file, are no longer needed. In some implementations, the data file may include information of the JavaScript variable in the second CSS file.

In some implementations, at block 304, the computing device (e.g., via rendering process 10) may generate a scripting language file (e.g., JavaScript file(s)), the JavaScript file may include a scripting language variable (e.g., JavaScript variable) of the JavaScript object. In some implementations, generating the JavaScript file may include adding a code segment to the JavaScript files. In some implementations, generating the JavaScript file may include generating a copy of the JavaScript file and adding the above-noted code segment.

In some implementations, WatchAndUpdate 404 may add the watch method to the JavaScript objects that are used by the CSS files, which refer to the above-noted data file generated by CSS Loader 400. By adding the watch method to the JavaScript objects, changes of the object may be tracked (discussed in more detail below). In some implementations, WatchAndUpdate 404 may add an update method to the JavaScript objects that are used by the CSS files, which refer to the above-noted data file generated by CSS Loader 400, as the data file may store the necessary configuration data for the callback method generation, the DOM element, property name, etc. Similarly, the update portion may schedule a periodical detection task, and a callback method referring to the above-noted data file generated in CSS Loader component 400.

In some implementations, at block 308, the computing device may (e.g., via rendering process 10) determine that a value of the scripting language object has changed in the scripting language file by checking a flag for the scripting language object (discussed below). In some implementations, at block 310, the computing device may (e.g., via rendering process 10) update a style of the element based upon, at least in part, determining that the value of the scripting language object has changed in the scripting language file. In some implementations, determining that the value of the scripting language object has changed in the scripting language file may include, at block 312, determining that the flag is set for the scripting language object. For example, the above-noted watch method may conduct a check of the flag for the JavaScript objects, and may set or "mark" the flag (in the global variable of the JavaScript object) as being "dirty" if the JavaScript object value has indeed been updated. If the JavaScript object value has not been updated, then the check of the flag will show it is not marked. In some implementations, the JavaScript object may include the flag. The JavaScript object may be a global variable when running, and the updates generally will not impact the JavaScript files. In some implementations, the detection task may call the callback method if the flag is set, and then the callback method may obtain the corresponding elements referenced, and update the related CSS style (e.g., through inline style). Updating the related CSS style through inline style may generally include adding the styles directly on the element.

At block 306, the computing device may (e.g., via rendering process 10) render an element of a webpage referenced by the JavaScript object based upon, at least in part, the JavaScript variable of the second CSS file. For example, now that the CSS supports using JavaScript variables directly in it as a value of the properties, rendering process 10 may enable the setting (e.g., dynamic setting) of the styles with JavaScript variables. For instance, as an example, if a user (e.g., front-end web page developer) defines a variable named 'topColor' in the JavaScript and assigns it with a valid color value, then this variable may be used in CSS like 'background-color: {{topColor}}'. As such, when the associated element is being rendered, the rendering process 10 may obtain the specific value of 'topColor' in JavaScript and replace it with 'topColor' in CSS to make sure the background color of that element is valid. When the value of that variable is modified, it will then be reflected in the corresponding style in CSS, which makes the CSS styles dynamic and controlled directly by variables in JavaScript (without direct DOM manipulation). By obtaining the JavaScript variables in CSS directly, there need not be a requirement to define a variable in CSS, and use of dirty checking and change detection callbacks may further improve system performance.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code or machine code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as JavaScript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a body area network (BAN), a personal area network (PAN), a metropolitan area network (MAN), etc., or the connection may be made to an external computer (for example, through the interne using an Internet Service Provider). In some implementations, electronic circuitry including, for example, programmable logic circuitry, an application specific integrated circuit (ASIC), field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted as optional). For example, two blocks shown in succession may, in fact, be executed substantially concurrently, or the blocks may sometimes be executed in the reverse order or not at all, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A method comprising:
generating, by a computing device, a data file including at least one property from a first cascading style sheet (CSS) file, the at least one property defining a scripting language object;
generating, by the computing device, a scripting language file, the scripting language file including a scripting language variable for the scripting language object;
generating, by the computing device, a second CSS file by replacing the at least one property from the data file with the scripting language variable of the scripting language file; and
rendering, by the computing device, an element of a webpage referenced by the scripting language object based upon, at least in part, the scripting language variable of the second CSS file.

2. The method of claim 1 wherein the data file includes information of the at least one property extracted from the first CSS file.

3. The method of claim 1 wherein the data file includes information of the scripting language variable in the second CSS file.

4. The method of claim 1 further comprising determining that a value of the scripting language object has changed in the scripting language file by checking a flag for the scripting language object.

5. The method of claim 4 further comprising updating a style of the element based upon, at least in part, determining that the value of the scripting language object has changed in the scripting language file.

6. The method of claim 4 wherein determining that the value of the scripting language object has changed in the scripting language file includes determining that the flag is set for the scripting language object.

7. The method of claim 5 wherein the style is updated through inline style.

8. A computer program product residing on a computer readable storage medium having a plurality of instructions stored thereon which, when executed by one or more processors, causes the one or more processors to perform operations comprising:
   generating, by a computing device, a data file including at least one property from a first cascading style sheet (CSS) file, the at least one property defining a scripting language object;
   generating, by the computing device, a scripting language file, the scripting language file including a scripting language variable for the scripting language object;
   generating, by the computing device, a second CSS file by replacing the at least one property from the data file with the scripting language variable of the scripting language file; and
   rendering, by the computing device, an element of a webpage referenced by the scripting language object based upon, at least in part, the scripting language variable of the second CSS file.

9. The computer program product of claim 8 wherein the data file includes information of the at least one property extracted from the first CSS file.

10. The computer program product of claim 8 wherein the data file includes information of the scripting language variable in the second CSS file.

11. The computer program product of claim 8 wherein the operations further comprise determining that a value of the scripting language object has changed in the scripting language file by checking a flag for the scripting language object.

12. The computer program product of claim 11 wherein the operations further comprise updating a style of the element based upon, at least in part, determining that the value of the scripting language object has changed in the scripting language file.

13. The computer program product of claim 11 wherein determining that the value of the scripting language object has changed in the scripting language file includes determining that the flag is set for the scripting language object.

14. The computer program product of claim 12 wherein the style is updated through inline style.

15. A computing system comprising:
   a memory; and
   at least one processor in communication with the memory, the at least one processor configured to:
      generate a data file including at least one property from a first cascading style sheet (CSS) file, the at least one property defining a scripting language object;
      generate a scripting language file, the scripting language file including a scripting language variable for the scripting language object;
      generate a second CSS file by replacing the at least one property from the data file with the scripting language variable of the scripting language file; and
      render, by the computing device, an element of a webpage referenced by the scripting language object based upon, at least in part, the scripting language variable of the second CSS file.

16. The computing system of claim 15 wherein the data file includes information of the at least one property extracted from the first CSS file.

17. The computing system of claim 15 wherein the data file includes information of the scripting language variable in the second CSS file.

18. The computing system of claim 15 wherein the processor is configured to determine that a value of the scripting language object has changed in the scripting language file by checking a flag for the scripting language object.

19. The computing system of claim 18 wherein the processor is configured to update a style of the element based upon, at least in part, determining that the value of the scripting language object has changed in the scripting language file.

20. The computing system of claim 18 wherein determining that the value of the scripting language object has changed in the scripting language file includes determining that the flag is set for the scripting language object.

* * * * *